United States Patent [19]

Vossos

[11] 3,916,058

[45] Oct. 28, 1975

[54] METHOD OF TREATING PAPER AND TEXTILES WITH ORGANICALLY MODIFIED SiO₂ AQUASOLS

[75] Inventor: Peter H. Vossos, Lisle, Ill.

[73] Assignee: Nalco Chemical Company, Oak Brook, Ill.

[22] Filed: June 25, 1973

[21] Appl. No.: 373,217

[52] U.S. Cl. ............... 428/241; 427/427; 427/428; 428/331; 428/537
[51] Int. Cl.² ..................... B32B 5/16; B32B 17/00
[58] Field of Search ............ 117/139.5 CF, 139.5 F, 117/121, 152, 154, 169 A; 252/313 S, 309; 427/427, 428; 428/241, 331, 537

[56] References Cited
UNITED STATES PATENTS

| 2,527,329 | 10/1950 | Powers et al. | 117/139.5 CF |
| 2,801,938 | 8/1957 | Iler | 117/152 |
| 3,652,329 | 3/1972 | Vossos | 117/139.5 F |

*Primary Examiner*—Ralph Husack
*Assistant Examiner*—Sadie L. Childs
*Attorney, Agent, or Firm*—John G. Premo; John S. Roberts

[57] ABSTRACT

Novel silica aquasols ranging in concentration from about 30 to 60% SiO₂ which are organically modified by a double coating of a water-dispersible or water-soluble long hydrocarbon chain quaternary ammonium compound and the method of making same. The products retain strength and frictionizing properties found generally beneficial in silica sols and add softness and antistatic properties to paper and textiles treated with these products.

7 Claims, No Drawings

METHOD OF TREATING PAPER AND TEXTILES WITH ORGANICALLY MODIFIED SIO₂ AQUASOLS

The present invention is concerned with a modified aquasol, its composition, method of manufacture, as well as with treating paper fibers and textile fibers with this modified aquasol. The modified aquasol is coated with a double layer of a quaternary ammonium salt or hydroxide. The pertinent prior patent art is noted below and deals with related compounds and methods of treating textiles wherein the treating agent is an organosol modified with a quaternary ammonium compound:

U.S. Pat. Nos. 2,692,863 - Iler (duPont); 3,629,139 - Vossos (Nalco); 3,652,329 - Vossos (Nalco); 3,660,301 - Kovarik et al (Nalco).

In addition, U.S. Pat. No. 2,614,995 Balthis (duPont) teaches the production of aqueous silica sols from the reaction of elemental silicon with a water-soluble amine.

With respect to U.S. Pat. No. 3,652,329 above, it is noted that there are several areas, especially in the paper industry, where an organosol such as described in the prior Vossos patent would not be suitable. The sols described in that Vossos patent are organosols whereas those of the present invention are aquasols. The organosol has an organic liquid as the liquid phase while in the aquasol the liquid phase is water. Typical examples of applications in which an aquasol would be more advantageous than an organosol include diapers, sanitary napkins (catamenial bandages), tea bags, etc., and places where the process system is aqueous. Places where an organosol, due to flammability, flash, and fire hazards, would be incompatible include mordant for anionic dyes, adhesion promoter for coatings, nonpermanent antistat, antisoil and non-dusting slip resistance.

In the literature R. K. Iler, *The Colloid Chemistry of Silica and Silicates*, Cornell Press, 1955, pages 100–112, relates to the types and effects of counter-ion concentration of additives to reverse the charge on the silica.

THE STARTING AQUEOUS SILICA SOLS

Generally, any aqueous silica sol can be used for this invention. These are well known to the art. The starting aqueous silica sol can range from 10 to 60 percent by weight of discrete, dense colloidal particles of amorphous silica. The average particle diameter can range from 3 to 150 millimicrons and can have an average surface area from 20 M²/g. to 1,000 M²/g. It is preferred that the starting aqueous silica sol be from 30 to 50 percent by weight of discrete, dense colloidal particles of amorphous silica. The preferred particle diameter should range from 16 to 22 millimicrons and have an average surface area from 135 to 190 M²/g.

The following is a table of commercially available aqueous silica sols. These are sold by Nalco Chemical Company under the Trademark Nalcoags.

It is preferred that the starting aqueous silica sols used in this procedure be double deionized by any of the well-known techniques. If the sol is not double deionized, it will be necessary to dilute the starting aqueous silica sol to approximately 35% silica.

A preferred starting silica sol for purposes of the present invention is that denoted as Nalcoag 1034A, a double deionized sol, containing 34% colloidal silica calculated as SiO₂. Typically, Nalcoag 1034A contains less than 600 ppm of sodium, Na⁺, calculated as Na₂O, and 180 ppm of chloride, Cl⁻, as combined chloride and sulphate.

TABLE I

| Nalcoag | 1030 | 1034A | 1035 | 1050 | 1060 | 1130 | 1140 |
|---|---|---|---|---|---|---|---|
| Percent colloidal silica, as SiO₂ | 30 | 34 | 35 | 50 | 50 | 30 | 40 |
| pH | 10.2 | 3.1 | 8.6 | 9.0 | 8.5 | 10 | 10 |
| Average particle size, millimicrons | 11–16 | 16–22 | 16–22 | 17–25 | 40–60 | 8 | 15 |
| Average surface area, M²/gram | 190–270 | 135–190 | 135–190 | 120–176 | 50–75 | 375 | 200 |
| Specific gravity at 68°F | 1.205 | 1.230 | 1.255 | 1.385 | 1.390 | 1.214 | 1.296 |
| Viscosity at 77°F c.p.s. | 5* | 5* | 5 | 70* | 5–10 | 7 | 8 |
| Na₂O, percent | 0.40 | 0.06* | 0.10 | 0.30 | 0.10 | 0.65 | 0.40 |

*Less than

In utilizing commercial silica sols, effort was made to start with a relative concentration of SiO₂:Na₂O of greater than about 200/1.

THE QUATERNARY AMMONIUM COATING

The quatenary ammonium compound has the formula:

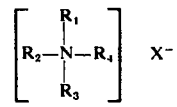

wherein
R₁, R₂ are methyl
R₃ is methyl or a C₈-C₂₀ long hydrocarbon chain;
R₄ is a C₈-C₂₀ long hydrocarbon chain;
X⁻ is an anion selected from the group consisting of chloride, bromide, iodide, and hydroxide.

Another quaternary ammonium compound that has been found useful is as follows:

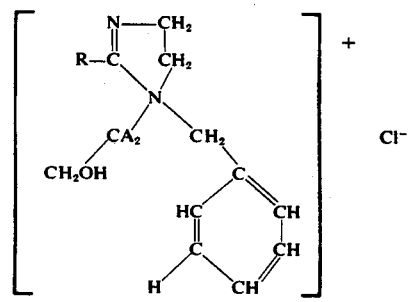

wherein
R is alkyl hydrocarbon chain having 2–6 carbon atoms.

In the formula above, the nitrogen substituent groups are chosen with the viewpoint of providing water solubility or having some degree of water dispersibility provided by 2 or 3 methyl coupled with 1 or 2 long hydrocarbon chain groups to provide the necessary fatty residue for the coating. Thus, operable compounds are those where $R_4$ or $R_3 + R_4$ are lauryl, plamityl, stearyl, oleyl, octyl, caprylyl, etc., and these may be similar or disimilar. Preferred substituents for $R_3$ and $R_4$ are quaternary amines derived from mixtures of fatty acids that occur in various fats and oils such as coconut oil, hydrogenated tallow, hydrogenated castor oil, etc. Specific examples of preferred quaternary compounds include:

Lauryl trimethyl ammonium chloride
dicocodimethyl ammonium chloride
di(hydrogenated tallow)dimethyl ammonium chloride
talow trimethyl ammoniumm chloride Additionally operable are the alkyl trimethyl ammonium salts with anions consonant with the formula above which are listed in Table 39, *Encyclopedia of Chemical Technology* II, Volume 19, Wiley Interscience, 1968, page 564, and incorporated herewith by reference.

Experimental data indicated that the coating on the silica particles by the quaternary is a double coating of molecular nature which, as an end result, reverses the negative charge on the silica with a positive charge on the outward nitrogen, which is part of the second coating of quaternary

SOLVENT

The starting silica aquasols are preferably double deionized sols, and it has been found highly advantageous to add a hydrophilic bridging solvent such as a lower alkanol and a preferred alkanol is isopropanol. The amount of isopropanol utilized is preferably about 3–10% by weight of the water in the aquasol. The lower alkanol, e.g., isopropanol, conveniently is added during the preparation of the aquasol at the point of addition of the quaternary. The addition of the alkanol helps stabilize the quaternary and to lessen gelation and precipitation tendencies. Generally, the mixture is stirred from about 1-60 minutes.

METHOD OF MANUFACTURE

In the present process, two discrete layers of the organic quaternary material are coated onto each silica particle. As the first layer goes on, it neutralizes any charge (negative) on the silica particle and imparts an organophilic surface. At this point, the sol becomes less stable and there is a tendency for gelation or precipitation to occur. There is a decided thickening visually noticeable. The lower alkanol solvent which is a requisite acts to solubilize or disperse the coated sol in water. As the second coat becomes a layer, a different charge (positive is imparted to the particle and the sol is re-stabilized. The second layer is oriented with its organophilic portion toward the surface and its ionic portion toward the solvent.

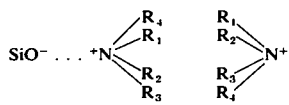

A preferred manufacturing process which enables the manufacture of the present doubel coated layer is as follows. In step one, the lower alkanol solvent is added to the quaternary amine in excess. As step two, the colloidal silica is added with double mixing into the amine solution. A preferred sol to use is a double deionized sol with the properties like Nalco 1034A (see Table I). A silica sol of this type has little charge on its surface and tends to be more stable in the critical period during the application of the first coating or in the intermediate stage of manufacture. Alternative commercial sols may be used, but optimum results are obtained by utilization of sols having 135–190 $M^2$/gram average surface area. In the initial contact between the silica particle and the amine, the system may thicken, but the alcohol prevents gelation or precipitation until the system thins out when additional silica sol is added. By the procedure of adding the sol to the amine solution, there is always an excess of amine and the two layers can go onto the silica sequentially. Further the simultaneous existence of both positive and negative sols is avoided.

The above is the preferred method for production of the double layered sols. Other less preferred methods are by utilization of high shear mixing and in certain favored cases the elimination of the alcohol stabilizer.

THE AMOUNT OF AQUASOL ADDED TO THE SUBSTRATE

The amount of coated aquasol added to the substrate, i.e., paper or textile fibers, may be widely varied. However, usually from about 0.10 to 2 percent by weight of aquasol is added based upon the weight of the substrate, and more often 0.2 to 1 percent. Also, in the usual case, the substrate is thus treated with from about 0.05 percent to about 0.6 percent silica expressed as $SiO_2$ as a preferred percentage.

THE AMOUNT OF QUATERNARY COATING ON $SiO_2$

The amount of the quaternary in relation to the silica depends upon the particle size of the colloidal silica. The smaller the particle size, the more quaternary will be required. In general, the ratio of $SiO_2$ to quaternary will be from 25 to 1 to 2 to 1, and more often will be from 3:1 to 10:1. For an average particle diameter of 20 millimicrons a ratio of about 3 to 1 is typical.

The above percentage or concentration additions of quaternary have been found optimum in using the combination of Nalcoag 1034A and the quaternary dicoco dimethyl ammonium chloride. However, additional variations over the range depending especially on the quaternary selected are necessary as the length of the long carbon chain or chains varies. The size of the silica particle also affects the amount of quaternary necessary. The purpose of the present invention is to produce a molecular double layer of quaternary and generally reversal of charge.

The present formulation uniformly requires a layer of quaternary which is physically sorbed and contains a molecular double layer. In the case of a charged silica sol, layer one, the innermost layer around the silica, neutralizes the negative charge on the silica particle, and the second or outermost layer disposed with its organophilic portion toward the $SiO_2$ surface reverses the charge so that the coated particle is now significantly positively charged. Thus, both the variables as to the silica particle size and as to the fatty chain length influence the amount of quaternary necessary to produce the double layer.

USE ON PAPER AND TEXTILES

The aquasol may be coated on the fiber, or paper, or substrate, such as by spraying techniques, including mist, fog, and fine spraying. In like manner, the substrate may be treated by dabbing the aquasol thereon. The aquasol compounds may be applied to the textile fibers and fabrics by spraying, padding, or by exhaustion.

In the application of the coated aquasols or treating agents of the present invention, it has been found that with respect to paper, where an aqueous system is generally utilized, the aquasols may be added both in the wet end and the dry end of the papermaking process.

The coated aquasols of this invention may be utilized as in frictionizing, a type of textile conditioning, and in increasing creep resistance in tire cords for addition to the textile slasher prior to the warp/weft weaving and as antistats in paper and textiles.

Another area for utilization in textiles for this invention is in combining aquaternary finishing agents which impart pliability, drape, and softness, as in U.S. Pat. No. 3,095,373 Blomfield (Wyandotte), with a silica coating designed for frictionizing, where the frictionizing agent textile applications serve to interlock the twisted yarn and add strength.

EXAMPLE I

Preparation of Quaternary Coated Silica Aquasols

A 30% $SiO_2$ sol in $H_2O$ was coated with a fatty quaternary amine. To 11.2 parts of Arquad 2C-75 (dicoco dimethyl quaternary amine chloride) was added 3.5 parts of isopropanol followed by 85.3 parts of Nalcoag 1034A deionized silica sol. The preparation was repeated several times and it was noted that the results improve where slow addition was followed with good mixing in the preparation to avoid the formation of gel particles. It was further noted that the product went through a very thick stage as the 1034A silica sol was added, but the sol thins out when it is all added. The product was found to be stable over a one-year period and was utilized in coating both paper and textiles.

An additional run which doubled the amount of isopropanol was advantageous in the speed of solubility of the quaternary. Theh silica sol utilized, Nalcoag 1034A, has a pH of 3.4. In separate runs, this pH was varied from 3.4 to 3.8 without adversely affecting the product. However, where the pH was lowered to about 2.9, difficulties were experienced with a cloudy product which did not exhibit a sol-like appearance.

Additional experiments or runs were made with Nalcoag 1050, a 50% colloidal $SiO_2$, which had been diluted to about 35% and the results were quite similar to those obtained utilizing the 30% $SiO_2$ or Nalcoag 1034A above as shown in Example II.

EXAMPLE II

Preparation of Double Coated Silica Sol

To 33.6 grams of Arquad 2C-75 was added 10.5 grams isopropanol followed by 150 ml of Nalcoag 1050 silica sol diluted with 90 grams of water. The preparation was made with good mixing throughout the addition steps. The product became very thick during the Nalcoag 1050 addition but thinned out again after a period of a few minutes. The product is stable over a 1-year period and could be utilized in coating paper and textiles.

EXAMPLE III

Tests of Brown Kraft Towelling Sprayed with the Combination Nalcoag 1034A and Dicoco Dimethyl Amine Brown paper Kraft towelling was treated with an aquasol of this invention as set out in Example I at dosages between 1–20 lbs/ton. The aquasol was diluted 250 ml per gallon of water and sprayed onto the paper towelling during the paper-making process. Typical results obtained are set forth in Table II below and the tests used are set forth in Table III, which summarizes by number the standard TAPPI test utilized.

TABLE II

| Test | Control Sample | Treated Sample |
|---|---|---|
| Tensile Strength (Dry) | 3.50 lbs | 3.15 lbs. |
| Tensile Strength (Wet) | 28.0 oz | 26.8 oz |
| Softness (Thwing Albert) | 37.0 sec | 28.5 sec |
| Absorption (Water) | 57 sec | 21 sec |
| Absorption (Castor Oil) | 47 mm | 36 mm |
| Cobb Test | 1.06 gm/cm$^2$ | 1.20 gm/cm$^2$ |
| Wick Test (Fluorescein in DI $H_2O$) | 80 mm/hr | 84 mm/hr |
| Abrasion (wt loss) | 50.2 mg | 66.0 mg |
| Internal Bond | 46 lbs/in$^2$ | 51 lbs/in$^2$ |
| Mullen | 12 lbs/in$^2$ | 10 lbs/in$^2$ |
| Stiffness (15°) | 30 Stiffness Units | 30 Stiffness Units |
| Antiskid | 38.2° | 38.1° |
| Tear Strength | 24.1 gms | 28.6 gms |
| Smoothness (Sheffield) | 413 Sheffield Units | 403 Sheffield Units |

TABLE III

| TAPPI Tests | |
|---|---|
| Fold | T511 su-69 |
| Mullen | T807 su-66 |
| Tear | T496 su-64 (RC-76) |
| Tensile | T456 m-49 |
| IGT | T499 su-64 |
| Opacity | T425 m-60 |
| T&N Ink | RC-19 (routine control) |
| Castor Oil Absorption | T462 m-43 |
| Net Rub | TAPPI 45, 890 (1962) |
| Cobb | T441 m-60 |
| Thwing-Albert Handle-o-meter (Drapability) | RC-63 |
| Porosity | RC-303 |
| Smoothness (Sheffield) | RC-285 |
| Softness (Gurley) | T479 sm-48 |
| Stiffness (Taber) | T451 m-60 |
| Brightness | T452 m-58 |
| Internal Bond | T506 su-68 |
| Absorption (Water) | T492 sm-60 |
| Abrasion | T476 ts-63 |
| Antiskid | T503 su-67 |
| Stiffness | T489 m-60 |
| Wick Test | RC-8 |

It is noted with reference to the data above that the consensus with respect to softness and adsorption, both aqueous and organic, of the product showed an advantage over the control sample and that there was very little diminution in wet or dry tensile strength. Strength was maintained while the softness and absorbency were increased.

Additional experimental data with similar results was obtained utilizing other quaternary compounds such as disoyo dimethyl ammonium chloride and the silica sol was varied to utilize Nalcoag 1050 versus Nalcoag 1034A.

EXAMPLE IV

In further experiments with newsprint grade paper utilizing colloidal silica, comparison tests were made with (1) a blank, (2) uncoated 50% silica aquasol (Nalcoag 1050), and (3) 1050 coated with dicoco dimethyl quaternary ammonium chloride with the results listed below in Table IV. Examples show improved tear and tensile strength while maintaining burst. This is quite surprising in that the stiffness is not increased.

TABLE IV

Summary of Paper Tests with Colloidal Silica
Values are ±

| Sample | Dosage Applied | Fold Test | Mullen Test | Tear Test | Tensile Test |
| --- | --- | --- | --- | --- | --- |
| Blank | — | 168 ± 55 | 44.6 ± 4.0 | 154 ± 7 | 19.1 ± 0.2 |
| Nalcoag 1050 | 0.25% | 180 ± 35 | 44.9 ± 3.5 | 171 ± 12 | 21.4 ± 0.2 |
| A * | 0.25% | 152 ± 56 | 42.2 ± 2.8 | 208 ± 4 | 20.4 ± 0.1 |

* Compound A is the modified aquasol of the present invention, the solids portion being 75% $SiO_2$ and 25% quaternary coating.

EXAMPLE V

Antistatic Properties

A quaternary coated aquasol was prepared according to the first paragraph of Example I above and was applied to a spinning cot in a cotton textile mill. The aquasol was thereby transferred to the yarn being processed. The static level produced by a treated versus an untreated cotton yarn was measured via a Faraday cage. The readings obtained are shown in Table V and are expressed in coulombs/gm × $10^{-7}$.

The level of the charge on the yarn was altered significantly as measured on the meter. The present aquasol can serve to dissipate a static charge.

TABLE V

Meter Readings

| Untreated | Treated with Aquasol Coated with Dicoco Dimethyl Ammonium Chloride |
| --- | --- |
| +15.8* | −10.7** |
| *Average of: | **Average of: |
| +13.2 | −10.8 |
| +13.3 | −10.6 |
| +13.0 | −10.6 |
| +20.7 | |
| +18.3 | |
| +16.4 | |

EXAMPLE VI

Preparation and Treatment of Textile 1. 100 g. of sol as 1034A and 40 g. of Arquad 2C-75 containing isopropanol (dicoco dimethyl ammonium chloride) were mixed via the preferred method of amine-alcohol-silica order of addition and a creamy consistent solution was obtained when ½ to ⅔ of the sol was added, which clarified to a blue-like sol upon addition of the complete amount of the silica sol.

In addition to the utilization of the preferred dicoco dimethyl ammonium chloride (Aliquat 336 - General Mills Chemicals; or Arquad 2C-75 - Armak Company), the following formulations were prepared and utilized on finished cottons.

2. 100 g. of 1034A sol and 40 G. Arquad 2S-75 (disoya dimethyl ammonium chloride). This compound at first gave a creamy thick paste which later cleared for spray purposes.

3. 100 g. 1034A sol and 60 G. Arquad L-11 (Armak Company) - quaternized beta amine.

4. 100 g. 1034A sol and 30 g. Aliquat 207 (distearyl dimethyl ammonium chloride) solid dissolved in 25% isopropanol.

The aquasol of this invention was tested as an additive in a starch sizing formulation. The size was applied to a cotton yarn used in making corduroy fabric. The function of the aquasol was to impart strength to the yarn to improve weaving efficiency.

The aquasol was added to a starch size at 10% of the dry starch weight. In the slasher operation of a textile mill, this starch-silica size was put on warp yarn. During the run, the yarn acquired a softer "hand" than usual and the run progressed well. Individual yarn fibers showed much less fuzzing than usual. Break strength of the yarn increased 8.2% over normal production.

In the final weaving process, efficiency increased to 95.72% compared to normal production of 91.54% done at the same time.

EXAMPLE VII

Double Layer Coating

Comparative experiments were utilized to test and ascertain the charge of a double layer coating prepared according to the practices of this invention with other layer coatings on silica.

1. Two-layer coating with isopropanol.

A two-layer coating of aqueous quaternary coated silica sol was prepared in a manner analogous to Example II. 75 g. of this material was mixed with 1 ml of hexane for one-half hour and allowed to separate overnight. Analysis of the hexane layer indicated that about 20% of the available silica had been extracted into the hexane layer.

2. One-layerr coating with isopropanol.

Again utilizing the procedure analogous to Example II but using ½ quantity of quaternary, a product was produced which was milky in nature and settled upon standing for a short time. When mixed with hexane as described in 1, 40% of the available silica was extracted into the hexane layer.

3. Two-layer coating without isopropanol.

The above (1) was repeated without the alkanol (i.e., isopropanol). A product was prepared which was viscous and milky in nature but settled only upon dilution.

When mixed with hexane, only 16% of the available silica was extracted into the hexane layer.

4. One-layer coating without isopropanol.

The procedure was followed similar to 2 but eliminating the alkanol. A milky liquid was produced which was much less viscous than 3 above. Settling was evident in the neat product. When diluted 10:1 with water, there was almost complete settling while the two-layer coating (3 above) diluted in such a manner remained turbid.

When mixed with hexane, about 74% of the available silica was extracted into the hexane layer.

In the above it is noted that the effect of isopropanol is shown by the difference in results between 1 and 3. Where no isopropanol was utilized in 3, the results were an unstable product and a precipitate. It is noted that in both the two-layer experiments 1 and 3 there was very little extraction into hexane.

It is noted that between 2 and 4, in the one-layer 4 there was a 74% extraction into hexane. The single layer quaternary coating has a "escaping tendency" to withdraw or leave the water layer by settling, but here it is extracted into a hydrocarbon hexane. The difference in hexane extraction coupled with the positive charge on the double-coated quaternary layer of the present invention show results consonant with the product of this layer structure and quarternary silica product set out in this invention.

With reference to the comparison of 1 and 2 above, it is believed that the results bear out the assertion that isopropanol or lower alkanol acts as a co-solvent or bridging solvent to assist the reaction.

The embodiments in this invention in which an exclusive property or privilege is claimed are defined as follows:

1. A method of improving absorbency and softness while retaining strength in paper or textile substrates which comprises the step of treating the paper or textile fibers with an aquasol having a double organic layer and containing a minor amount of an aqueous polar solvent selected from lower alkanols having uniformly dispersed therein discrete dense colloidal particles of amorphous silica having an average particle diameter of 3–150 millimicrons and an average surface area of from about 20 $M^2/g$ to 1000 $M^2/g$, said silica particles having absorbed on their surfaces a quaternary ammonium salt or hydroxide with the weight ratio silica, expressed as $SiO_2$, to the quaternary ammonium being at least 2:1 wherein the quaternary ammonium has the formula:

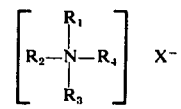

wherein
$R_1$, $R_2$ are methyl
$R_3$ is methyl or a $C_8$-$C_{20}$ long hydrocarbon chain;
$R_4$ is a $C_8$-$C_{20}$ long hydrocarbon chain;
$X^-$ is an anion selected from the group consisting of chloride, bromide, iodide, and hydroxide.

2. The method according to claim 1 wherein the colloidal silica particles have an average surface area of from about 135–190 $M^2/g$.

3. The method according to claim 1 including the step of treating paper.

4. The method according to claim 1 including the step of treating textile fibers or fabrics.

5. The method of claim 1 wherein said quaternary ammonium salt is dicoco dimethyl ammonium chloride.

6. The method of claim 1 wherein said quaternary ammonium salt is di(hydrogenated tallow)dimethyl ammonium chloride.

7. The method of claim 1 wherein said quaternary ammonium salt is tallow trimethyl ammonium chloride.

* * * * *